United States Patent [19]

Heitmann et al.

[11] 4,164,749
[45] Aug. 14, 1979

[54] METHOD AND APPARATUS FOR DIGITALLY ENCODING COLOR VIDEO SIGNALS HAVING QUADRATURE MODULATED SUBCARRIERS

[75] Inventors: Jürgen Heitmann, Seeheim; Hans-Peter Maly, Darmstadt, both of Fed. Rep. of Germany

[73] Assignee: Robert Bosch GmbH, Stuttgart, Fed. Rep. of Germany

[21] Appl. No.: 808,700

[22] Filed: Jun. 21, 1977

[30] Foreign Application Priority Data

Jun. 26, 1976 [DE] Fed. Rep. of Germany ....... 2628816

[51] Int. Cl.[2] .......................... H04N 9/32; H04N 9/39
[52] U.S. Cl. ...................................................... 358/13
[58] Field of Search ................................... 358/12, 13

[56] References Cited

U.S. PATENT DOCUMENTS 3,795,763  3/1974  Golding et al. .................. 358/13
4,051,516  9/1977  Weston ............................ 358/11

OTHER PUBLICATIONS

Busby-Principles of Digital Television Simplified-SMPTE-vol. 84 pp. 542-545, Jul. 1975.
Sabatier-Differential Coding of Colour TV Signal Components ACTA Electronica-vol. 19-#3-pp. 245-253, 1976.
BBC Engineering-#102, p. 36, Mar. 1976.
Goldberg-PCM NTSC Television Characteristics Jour. SMPTE vol. 85 #3 Mar. 1976, pp. 141-145.

Primary Examiner—Robert L. Griffin
Assistant Examiner—Joseph A. Orsino, Jr.
Attorney, Agent, or Firm—Littlepage, Quaintance, Murphy, Richardson and Webner

[57] ABSTRACT

An analog PAL color television signal which is to be encoded is passed through a comb filter to separate the signal into a chrominance component and a luminance component each having a carrier frequency. Each signal is then separately scanned at a rate which is directly related to the color carrier frequency (4.43 MHz) of the signal. The luminance signal is fed to a scanning and holding circuit which scans it at a rate of twice the color carrier frequency or 8.86 MHz. The chrominance signal is fed to a scanning and holding circuit which scans it at a rate which is one-half the color carrier frequency of 2.21 MHz. This scanning and holding of each component signal converts the signals into a corresponding PAM signal. Each PAM signal is then quantized and encoded in a PCM coder. The resulting signals are applied to a digital combiner which thereby produces a digital color video signal.

4 Claims, 2 Drawing Figures

METHOD AND APPARATUS FOR DIGITALLY ENCODING COLOR VIDEO SIGNALS HAVING GUADRATURE MODULATED SUBCARRIERS

BACKGROUND OF THE INVENTION

1. Field of the Invention

The invention generally relates to encoding of a digital television signal and, more specifically, relates to a procedure for the digital encoding of the chrominance and luminance components of quadrature modulated color video signals.

2. Background of the Invention

It is known from the "Journal of the SMPTE", Volume 85, March 1976, Pages 141-145, that color video signals can be closed coded or separately encoded. In the case of closed coding, the composite analog color video signal is first amplitude scanned and subsequently converted into a sequence of digital code words in accordance with the scanned amplitude values. In the case of separate coding, as is involved in the present invention, the color video signal is split into the two analog signal components, luminance and chrominance, of the color video signal and these are then digitalized separately. With the separate coding procedure, analog color video signals of any compatible color television standards, for example, PAL and SECAM, can be converted into digital signals which are compatible with each other.

SUMMARY OF THE INVENTION

In accordance with their different signal bandwidths, the two signal components of luminance and chrominance are extracted from the analog PAL color television signal and scanned or sampled at different scanning rates. Furthermore, the luminance component is scanned below the Nyquist Scanning Theorem which holds that the minimum sampling frequency which can be used without introducing unwanted components into the decoded analog signal is equal to twice the highest frequency of the original analog signal. As is the case with any PAL system, in order to avoid disruptions during the remodulation, the scanning rate is preset so that a half line offset occurs at the line frequency. Due to the odd number of lines for the established color television standards, in this case, however, the scanning times shift with respect to each other in successive frames. This problem leads to increased picture instability with flicker at the vertical edges of the reproduced picture.

The procedure of the disclosed invention has the advantage that, besides a considerable reduction in picture disruption, it is also compatible with the previously known methods for closed coding of color video signals.

In the case of closed coding of NTSC color video signals, as is well known, a scanning rate is chosen for the color video signal scanning which is four times the color carrier frequency. The compatibility between closed and separate coding is achieved by the instant invention by evaluating each second scanning value. For example, in coding a PAL color television signal, a scanning frequency of twice the chrominance or color carrier frequency which is equal to 8.86 MHz is chosen for the luminance component. Simultaneously, the scanning frequency for the chrominance component, based on the invention, is selected so that it forms an integral part of the color carrier frequency of the analog video signal. Thus, a digital component breakdown of a closed coded color video signal is likewise possible in an especially advantageous fashion, just as the renewed separate coding of an already digitalized PAL color television signal.

By means of this disclosed method, the scanning frequency of the chrominance component of a PAL television signal is one-fourth of the scanning frequency of the luminance component, and combined with this, and a phase adjustment, good horizontal resolution is retained in the color information.

The apparatus which is used to achieve this result is comprised of a comb filter which separates the analog PAL color television signal into its separate chrominance and luminance components. The separate components are fed to separate scanning and holding circuits which are preset according to the method described above. The scanning circuits sample the separate luminance and chrominance components to provide separate corresponding pulse amplitude modulated (PAM) signals. The PAM signals are then delayed by the holding circuits. Each delayed PAM signal is fed to a quantizer and a pulse-code modulation (PCM) encoded to provide encoded signals. Finally, these encoded signals are applied to a digital combiner which provides an output corresponding to the digital color video signal.

It is an object of this invention to provide a method and apparatus for encoding an analog color television signal which uses a scanning or sampling frequency which is directly related to the color carrier frequency. It is a further object of this invention to provide a method for separately coding a color television signal which reduces sampling redundancy. It is yet another object of this invention to provide a method and apparatus for encoding a color television video signal which scans or samples the separate components of the signal at a rate which is below the Nyquist Limit. Yet another object of this invention is to provide a method and apparatus for converting incompatible color television signals into digital signals which are compatible.

BRIEF DESCRIPTION OF THE DRAWINGS

These objects and others will become apparent to those skilled in the art by referring to the accompanying drawings in which.

DESCRIPTION OF THE PREFERRED EMBODIMENT

Figure 1:
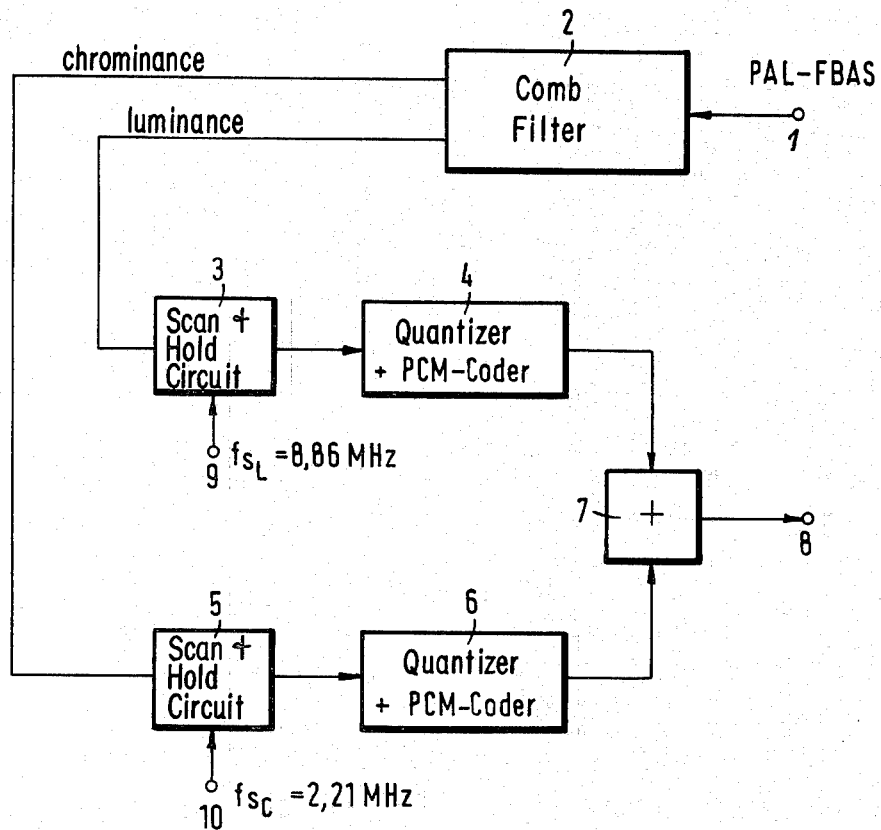
FIG. 1 is a block diagram showing the apparatus for separately coding a PAL color television signal.

The block diagram of FIG. 1 shows the principal circuit configuration for separate coding of an analog video signal. It is assumed in the design example presented here that an analog PAL color television signal is to be digitalized using the separate coding method. For this, the PAL color television signal appearing at terminal 1 is fed to a comb filter 2, which splits the PAL color television signal into the two signal components, chrominance and luminance. Any standard comb filter which is a wave filter having a frequency spectrum consisting of a number of equally spaced elements can perform this function. Such a filter would have repetitive pass and stop bands (resembling the teeth of a comb) and is usually implemented with a transversal filter. Such a filter is disclosed in German patent specification DT-AS 22 63 678.

The analog luminance component which can be picked off at the output of the comb filter 2 is digitalized in a first channel. This first channel consists of a scanning and holding circuit 3, the output of which is connected to stage 4, which consists of a quantizer and a PCM coder. The amplitude values of the luminance component are scanned or sampled at a frequency $f_{sL}$ in the scanning and holding circuit 3, and thereby converted to a corresponding pulse amplitude modulated (PAM) signal which is properly delayed to provide synchronization with the chrominance component. This PAM delayed signal is quantized in stage 4 and, depending on the quantization step, coded in a PCM code.

In the simplest case, the scanning and holding circuit consists of a sample and hold switch which is a switch and a storage condenser. The storage condenser is converted to the input signal through the contact portion of the switch as a function of the frequency fs. When the contact of the switch is open, the output signal of the circuit remains at the latest potential value on the condenser.

Similarly to the case of the luminance component, the analog chrominance component is digitalized in a second channel. This second channel is structured similarly to the first channel and likewise consists of a scanning and holding circuit 5 converting the signal to a PAM signal which is properly delayed to provide synchronization with the luminance component. This PAM delayed signal is applied to stage 6 which contains the quantizer and PCM coder. The digitalized signal components derived in this fashion for chrominance and luminance are brought together in a stage 7 which is a digital combiner and provides a corresponding output which represents a digitalized color television signal at terminal 8.

The above-described invention does not require that the principle of preset scanning in the case of separate coding be applied. According to the Scanning Theorem of Nyquist, the scanning frequency must be chosen to be at least twice as high as the highest signal frequency to be scanned. In the case of a color video signal with a frequency bandwidth of 5 MHz, this leads to a scanning frequency of at least 10 MHz. However, this high scanning frequency is not compatible with a requirement for as low a data rate as possible. For this reason, a so-called below-Nyquist scanning finds application in the disclosed invention. The disruptions associated with the below-Nyquist scanning can be eliminated by means of a switch-comb filter such as the one described in German Pat. Spec. DT-OS 24 37 091. However, this type of scanning in the PAL system requires a scanning frequency positioned with respect to the line frequency in half line offset.

This is because the PAL system uses alternate line averaging and line-period delay by using the quadrature-modulation method, similar to the NTSC system. The R-Y and B-Y components of the video signal are simultaneous pairs of components transmitted as amplitude modulated side bands of a pair of suppressed subcarriers in quadrature, as in the NTSC system. However, the phase of the R-Y signal is reversed on alternate lines. Unlike the SECAM system, in which the subcarrier is always present, the subcarrier of the PAL system disappears on fully desaturated signals. The phase reversal of the R-Y signal on alternate lines causes the R-Y signal to lose interlace with the B-Y signal. Hence, the R-Y dot pattern has maximum visibility when B-Y is interlaced at an odd multiple of one-half of the line scanning frequency. As a compromise, the subcarrier is chosen at one-quarter line offset, i.e., at an odd multiple of one-fourth of the line scanning frequency.

This offset requirement is met with the invention method for a PAL color television signal by selecting and providing a scanning frequency at terminal 9 for the scan signal of the scanning and holding circuit 3, which corresponds to twice the color carrier frequency of the PAL color television signal. As is well known, the color carrier in the case of PAL color television signal is positioned at a so-called quarter-line offset. By frequency doubling of the color carrier, one obtains the requisite half-line offset. In order to achieve an equal spatial positioning of the individual scanning points in each frame, the scanning frequency $f_{sL}$ for the luminance component is rotated 180° in phase following each frame.

Figure 2:
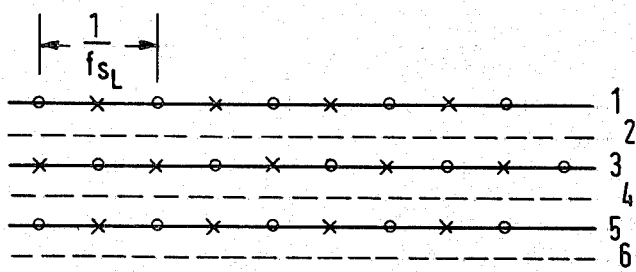
FIG. 2 is an example of a scanning scheme for the luminance component based on the invention method.

The scanning scheme pictured in FIG. 2 for the luminance component should clarify this process. Six adjacent lines are pictured for this purpose in the figure, where lines 1, 3 and 5 represented with a solid line stand for the odd lines of a field and the dashed lines 2, 4 and 6 represent the even lines of the field. For a frame (25 Hz), the result is then that the spatial position indicated by 0 indicates the scanning points in time and those indicated with X, the scanning points of the following frame. By means of a 180° phase rotation for every spatial position in an alternating manner, by frame, of the scanning signal for the luminance component at terminal 9, the effect is achieved that the scanning spots now coincide and thereby flicker disruptions (12.5 Hz) are avoided.

In order to also gain a stable image impression for the chrominance component, the scanning frequency of the chrominance component is chosen so that it forms an integral line part of the luminance scanning frequency. An additional consideration for the harmonic staggering of the scanning frequency for the chrominance component with respect to the scanning frequency of the luminance component is the requirement for compatibility with digitalized color video signals, which in line with a closed coding scheme are generated with a frequency four times the chrominance carrier frequency as the scanning rate. These requirements are met with a scanning frequency for the chrominance component in which the scanning frequency makes up one-fourth of the luminance scanning rate. The scanning frequency, $f_{sC}$, of the scanning signal at terminal 10 for the scanning and holding circuit 5 is thus set at 2.2168 MHz. However, along with this, one obtains an eighth-line offset for a PAL color television signal. With a one-fourth line offset, the scanning points in successive alternate lines now come one under the other. The scanning signal for the chrominance component is controlled so that the scan phase position occurs at the start of each line. This null offset is achieved by a line frequency phase shift of −45° for the chrominance component of the scanning signal at terminal 10.

What is claimed is:
1. An apparatus for digitally encoding sequential frames of a color video signal having a quadrature modulated subcarrier comprising:
(a) Separating means for separating the color video signal into a chrominance component and a luminance component;

(b) First scanning and holding means, having an output and a luminance scanning frequency input, for scanning the luminance component at twice the color subcarrier frequency, thereby providing at its output a pulse amplitude modulated (PAM) luminance component, said first scanning and holding means delaying the PAM luminance component;

(c) Second scanning and holding means, having an output and a chrominance scanning frequency input, for scanning the chrominance component at exactly one quarter the luminance scanning frequency, thereby providing at its output a pulse amplitude modulated (PAM) chrominance signal, said second scanning and holding means harmonically coupling and delaying the PAM chrominance signal so that it is in synchronization with the PAM luminance signal;

(d) First and second quantizing and pulse code modulating encoder means connected respectively to the outputs of the first and second scanning and holding means for quantizing and encoding the PAM signals into digitalized components; and (e) Digital combining means for combining the digitalized component to provide a digital color video signal.

2. A method for digitally encoding sequential frames of a color video signal having a quadrature modulated subcarrier comprising the steps of:

(a) Separating the color video signal into a chrominance component and a luminance component;

(b) Scanning the luminance component with a luminance scanning frequency which is twice the color subcarrier frequency, thereby obtaining a scanned luminance component;

(c) Scanning the chrominance component with a chrominance scanning frequency which is exactly one quarter the luminance scanning frequency, thereby obtaining a scanned chrominance component harmonically coupled to the scanned luminance component;

(d) Holding the scanned components so that they are in synchronization one with another;

(e) Quantizing and encoding each of the components in a pulse code modulated coder, thereby obtaining encoded components; and (f) Combining the encoded components in a digital combiner thereby obtaining a digital color video signal.

3. The method of claim 2 further comprising the step of phase shifting the scanned luminance component by 180° during alternate frames of the video signal.

4. The method of claim 2 further comprising the step of phase shifting the scanned chrominance component by −45°.

* * * * *